United States Patent
Katiyar et al.

(10) Patent No.: US 11,736,275 B2
(45) Date of Patent: Aug. 22, 2023

(54) INTEGRATED INFRASTRUCTURE SECURE COMMUNICATION SYSTEM

(71) Applicant: Dell Products L.P., Round Rock, TX (US)

(72) Inventors: Shivendra Katiyar, Bangalore (IN); Naman Goel, Bangalore (IN); Ravishankar Kanakapura Nanjundaswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 17/363,457

(22) Filed: Jun. 30, 2021

(65) Prior Publication Data

US 2022/0385456 A1 Dec. 1, 2022

(30) Foreign Application Priority Data

May 28, 2021 (IN) .............................. 202111023889

(51) Int. Cl.
*H04L 9/08* (2006.01)
*H04L 9/32* (2006.01)

(52) U.S. Cl.
CPC .......... *H04L 9/0825* (2013.01); *H04L 9/3278* (2013.01)

(58) Field of Classification Search
CPC ............................. H04L 9/0825; H04L 9/3278
See application file for complete search history.

(56) References Cited

U.S. PATENT DOCUMENTS

| | | | | |
|---|---|---|---|---|
| 5,535,276 A | * | 7/1996 | Ganesan ............... | H04L 9/0825 380/46 |
| 8,516,269 B1 | * | 8/2013 | Hamlet ................. | G06F 21/445 713/180 |
| 9,980,140 B1 | * | 5/2018 | Spencer ............... | H04W 12/02 |
| 2005/0246771 A1 | * | 11/2005 | Hunt ..................... | H04L 9/3273 726/18 |
| 2017/0063559 A1 | * | 3/2017 | Wallrabenstein ....... | H04L 9/085 |
| 2018/0234255 A1 | * | 8/2018 | Fu ............................. | H04L 9/30 |

FOREIGN PATENT DOCUMENTS

EP 1473869 A1 * 11/2004 ......... H04L 63/0421

* cited by examiner

*Primary Examiner* — Phy Anh T Vu
(74) *Attorney, Agent, or Firm* — Joseph Mencher

(57) ABSTRACT

An integrated infrastructure secure communication system includes at least one chassis, and a plurality of computing devices that are located in the at least one chassis and that are coupled to each other. A first computing device included in the plurality of computing device receives a communication from a first component in the first computing device, retrieves a vendor-based key, and encrypts the communication using the vendor-based key to provide a first-level encrypted communication. The first computing device also generates a first random key, encrypts the first-level encrypted communication with the first random key to provide a second-level encrypted communication, and transmits the second-level encrypted communication to a second computing device that is included in the plurality of computing devices.

20 Claims, 14 Drawing Sheets

INTEGRATED INFRASTRUCTURE SECURE COMMUNICATION SYSTEM

CROSS-REFERENCE TO RELATED APPLICATIONS

This application claims priority to Indian Provisional Application No. 202111023889, filed May 28, 2021, the disclosure of which is incorporated herein by reference in its entirety.

BACKGROUND

The present disclosure relates generally to information handling systems, and more particularly to securing communications between information handling systems that are part of an integrated infrastructure.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, storage systems, networking devices, and/or other computing devices known in the art, are sometimes provided as part of an integrated infrastructure system such as a Converged Infrastructure (CI) system or Hyper-Converged Infrastructure (HCI) system in order to, for example, reduce deployment complexity by eliminating hardware incompatibility issues. In such integrated infrastructure systems, the server devices, storage systems, and/or networking devices may communicate with each other within a chassis or other physical boundary that are intrinsically secure due to internal fabrics and device/system interconnects. However, such integrated infrastructure systems may also be built using logical groupings of infrastructure components (e.g., emerging composable hardware platforms provide logical platforms via components selected from a group of physical servers), which may introduce security issues with regard to communications between those components that may be externally networked together.

In such integrated infrastructure environments that include external communication channels between components, conventional networking security techniques such as the Secure Socket Layer (SSL) protocol, the Transport Layer Security (TLS) protocol, and/or application-layer-created trust-based boundaries may be utilized to secure communications, but such conventional security techniques rely on the exchange of static vendor-based certificates. As will be appreciated by one of skill in the art in possession of the present disclosure, various attack techniques (denial-of-service attacks, man-in-the-middle attacks, phishing attacks, etc.) may be utilized to obtain unauthorized access to the vendor-based certificates that then enables unauthorized access to the hardware management network, which allows for the unauthorized alteration of configurations that can affect the performance of applications and/or workloads provided by the integrated infrastructure system. One conventional solution to such issues are to provide firewalls for the computing devices in the integrated infrastructure system, but such firewall solutions only provide endpoint computing device protection and may be circumvented via the attacks discussed above. Another conventional solution to such issues is to provide Multi-Factor Authentication (MFA) for the computing devices in the integrated infrastructure system, but such MFA solutions prevent automation of the integrated infrastructure system, making hem infeasible for most integrated infrastructure deployments.

Accordingly, it would be desirable to provide an integrated infrastructure system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an integrated infrastructure secure communication engine that is configured to: receive a communication from a component that is coupled to the processing system; retrieve a vendor-based key; encrypt the communication using the vendor-based key to provide a first-level encrypted communication; generate a first random key; encrypt the first-level encrypted communication with the first random key to provide a second-level encrypted communication; and transmit the second-level encrypted communication to a computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
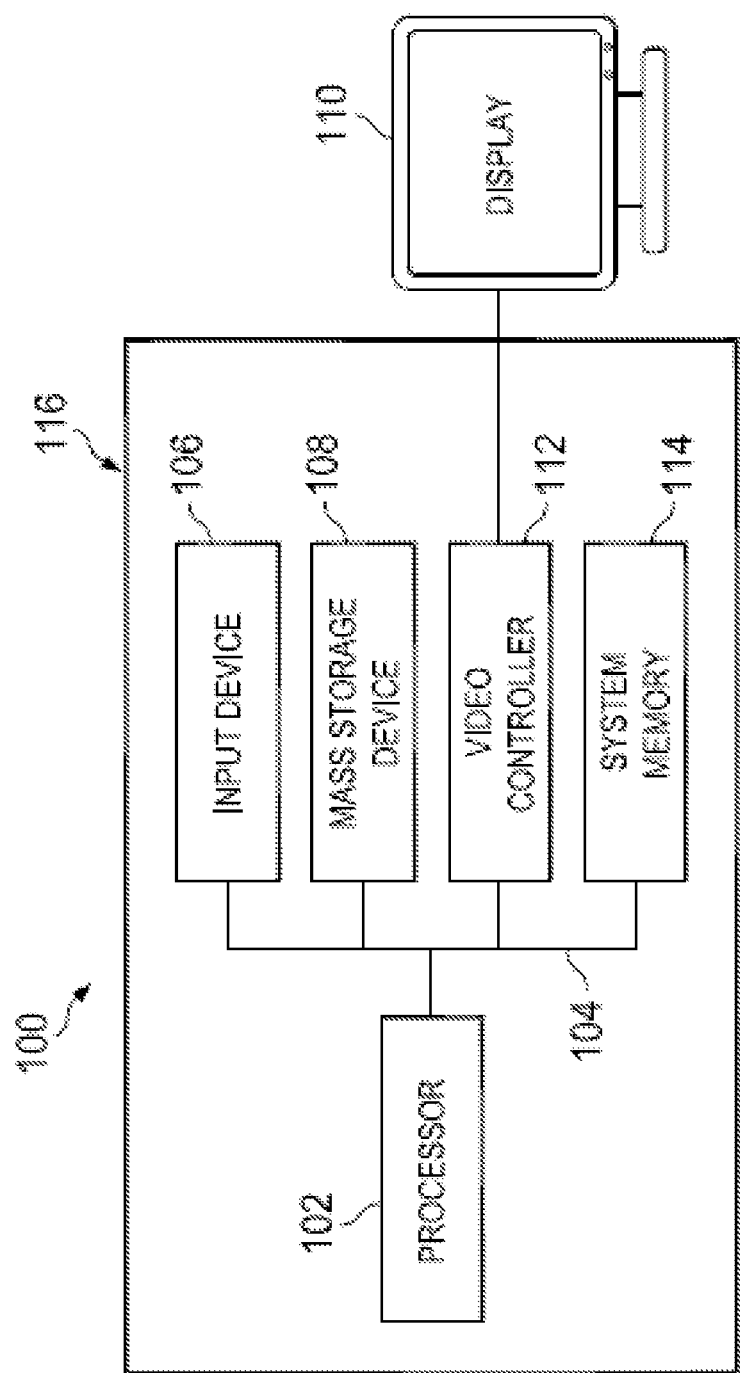
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
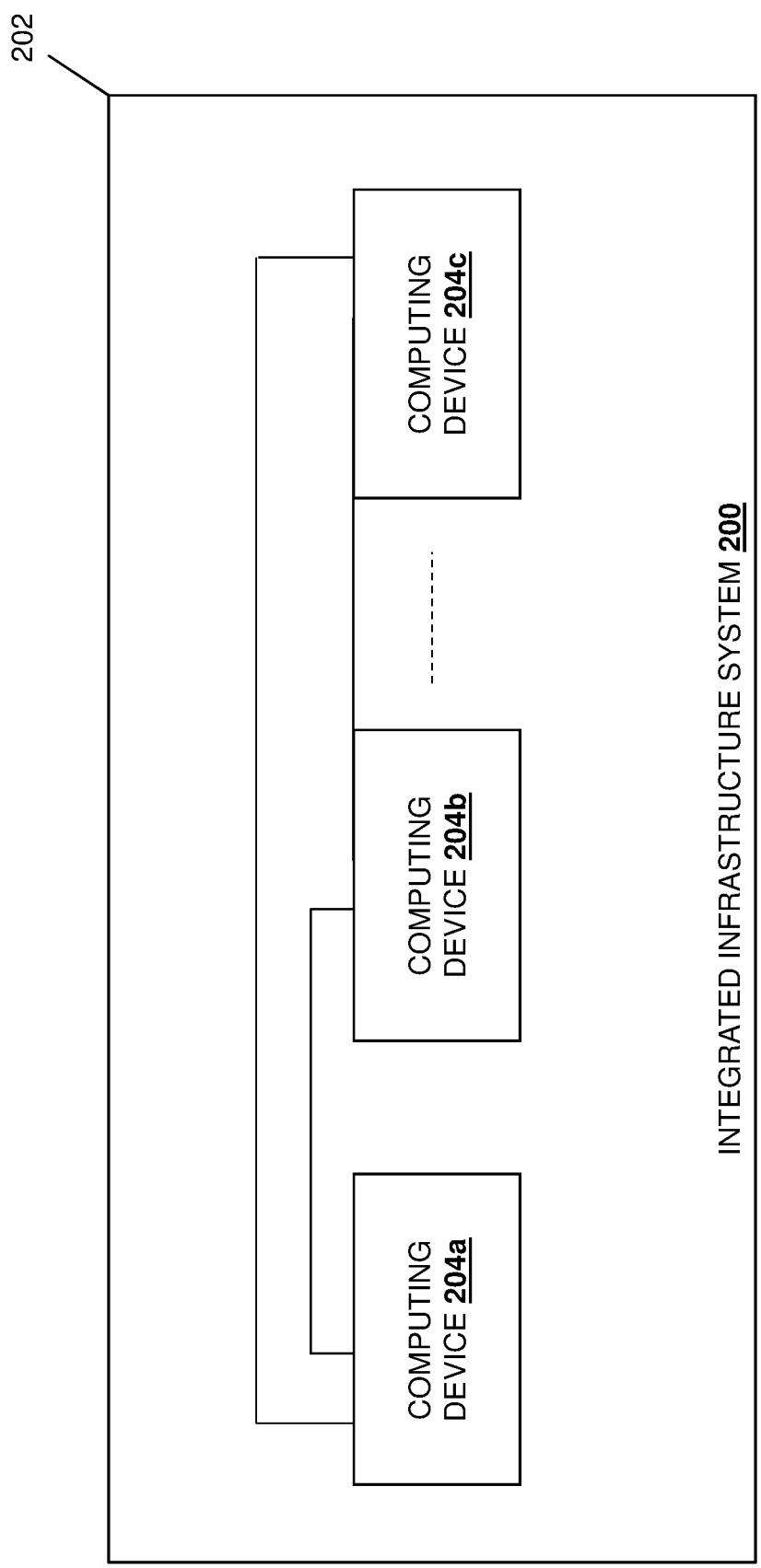
FIG. 2 is a schematic view illustrating an embodiment of an integrated infrastructure system that may utilize the integrated infrastructure secure communication system of the present disclosure.

Referring now to FIG. 2, an embodiment of an integrated infrastructure system 200 is illustrated. In the different embodiments, the integrated infrastructure system 200 may include one or more chassis 202 that house the components of the integrated infrastructure system. For example, the integrated infrastructure system 200 may be provided by a single DELL EMC® POWEREDGE® MX7000 modular chassis available from DELL® Inc. of Round Rock, Tex., United States, and thus may house its components in a single chassis. In other examples, the integrated infrastructure system 200 may be provided by the DELL EMC® VXRACK®, the DELL EMC® VXRAIL®, or a multi-chassis DELL EMC® POWEREDGE® system available from DELL® Inc. of Round Rock, Tex., United States, and thus may house its components in a plurality of chassis. However, while a few specific examples are provided, one of skill in the art in possession of the present disclosure will appreciate how the integrated infrastructure system 200 may be provided in a variety of manners while remaining within the scope of the present disclosure as well.

In the illustrated embodiment, the integrated infrastructure system 200 includes a plurality of computing devices 204a, 204b, and up to 204c. In an embodiment, any or each of the computing devices 204a-204c may be provided by the IHS 100 discussed above with reference to FIG. 1, may include some or all of the components of the IHS 100, and in the specific examples discussed below are provided by server devices, storage systems, and/or networking devices. However, while illustrated and discussed as being provided by particular computing devices, one of skill in the art in possession of the present disclosure will recognize that computing devices provided in the integrated infrastructure system 200 may include any devices that may be configured to operate similarly as the computing devices 204a-204c discussed below. As will be appreciated by one of skill in the art in possession of the present disclosure, each of the computing devices 204a-204c may be provided by the same vendor or other computing device provider in order to allow each of the computing devices to store and utilize the same vendor-based certificates discussed below. Furthermore, while a specific system 200 has been illustrated and described, one of skill in the art in possession of the present disclosure will recognize that the system of the present disclosure may include a variety of components and component configurations while remaining within the scope of the present disclosure as well.

Figure 3:
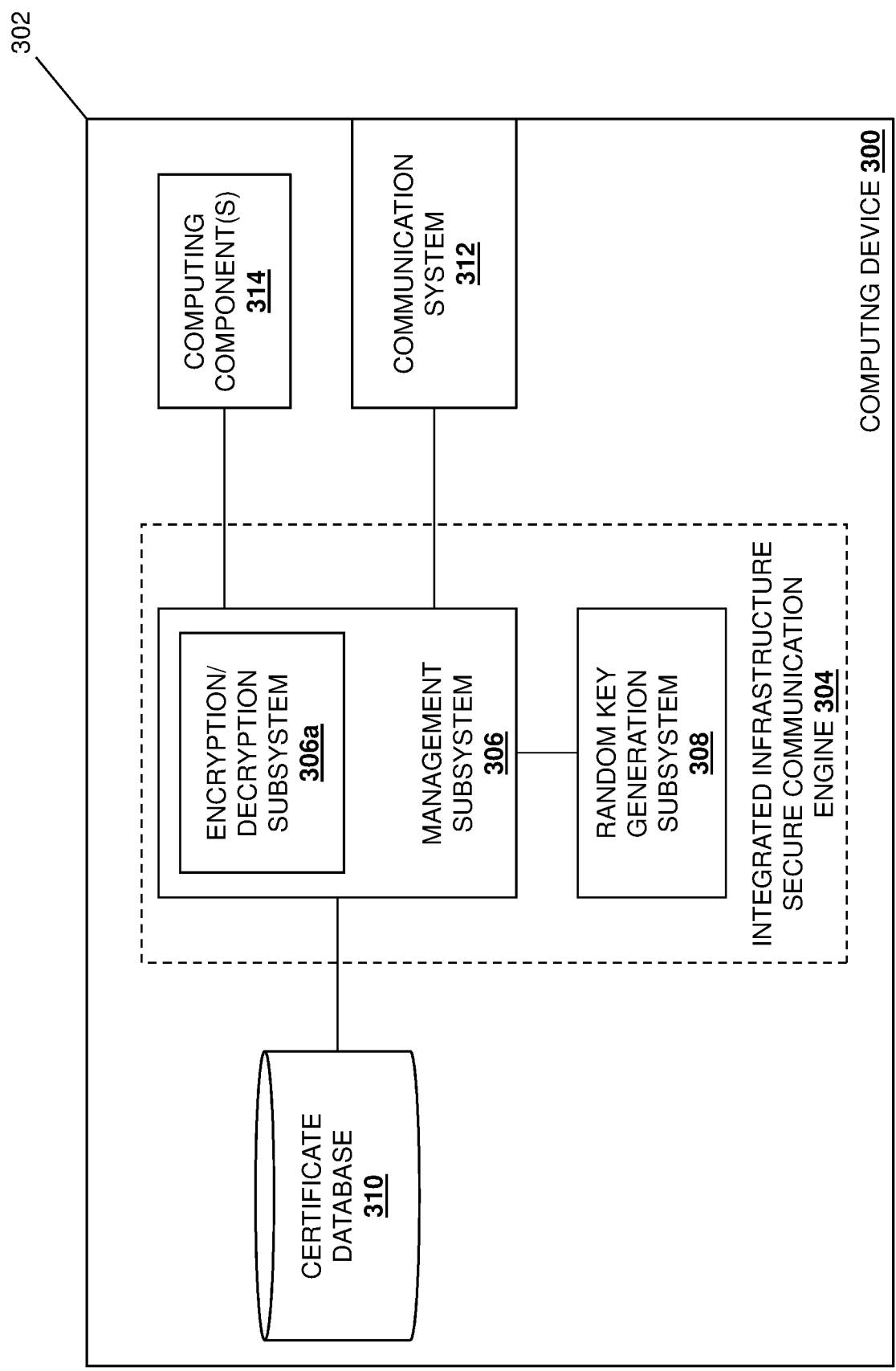
FIG. 3 is a schematic view illustrating an embodiment of a computing device that may be included in the integrated infrastructure system of FIG. 2.

Referring now to FIG. 3, an embodiment of a computing device 300 is illustrated that may provide any or each of the computing devices 204a-204c discussed above with reference to FIG. 2. As such, the computing device 300 may be provided by the IHS 100 discussed above with reference to FIG. 1 and/or may include some or all of the components of the IHS 100, and in the specific examples are discussed below as being provided by server devices, storage systems, and/or networking devices. However, while illustrated and discussed as being provided by particular computing devices, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated below. For example, the chassis 302 may house a processing system (not illustrated, but which may include one or more of the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an integrated infrastructure secure communication engine 304 that is configured to perform the functionality of the integrated infrastructure secure communication engines and/or computing devices discussed below.

In the specific example illustrated in FIG. 3, the integrated infrastructure secure communication engine 304 includes a management subsystem 306. For example, the management subsystem 306 may be provided by a management module that is included in the computing device 300, with specific examples including a Baseboard Management Controller (BMC) (e.g., the integrated DELL® Remote Access Controller (iDRAC)) when the computing device 300 is provided by a server device, a storage controller when the computing device 300 is provided by a storage system, and a network operating system when the computing device is provided by a networking device. However, while specific management subsystems in particular types of computing devices are described, one of skill in the art in possession of the present disclosure will recognize that the management subsystem 306 may be provided by a variety of management modules while remaining within the scope of the present disclosure as well. In the illustrated embodiment, the management subsystem 306 includes an encryption/decryption subsystem 306a that may be configured to perform any of the encryption and decryption operations discussed below.

In the specific example illustrated in FIG. 3, the integrated infrastructure secure communication engine 304 also includes a random key generation subsystem 308. For example, the random key generation subsystem 308 may be provided by a Physical Unclonable Function (PUF) module that is configured for use in generating random keys, as well as a processing component that may utilize the PUF module to generate random keys. In the examples below, the processing component in the random key generation subsystem 308 that utilizes the PUF module to generate random keys is included in a smart Network Interface Controller (Smart-NIC) and provided by a Field Programmable Gate Array (FPGA) device, although one of skill in the art in possession of the present disclosure will appreciate how the processing component in the random key generation subsystem 308 that utilizes the PUF module to generate random keys may be provided by a System on Chip (SoC) and/or other processing components in other devices while remaining within the scope of the present disclosure as well. In yet other embodiments (e.g., when the SmartNIC discussed above is not present in the computing device), computing devices provided in an integrated infrastructure system may include personality modules that identify the ability of those computing devices to perform the secure communication functionality described herein, and that may include the hardware and/or software necessary to perform any of that secure communication functionality.

The chassis 302 may also house a storage system (not illustrated, but which may include the storage 108 discussed above with reference to FIG. 1) that is coupled to the integrated infrastructure secure communication engine 304 (e.g., via a coupling between the storage system and the processing system) and that includes a certificate database 306 that is configured to store the vendor-based certificate discussed below as being utilized to generate a vendor-based key that is the same for computing devices provided by the same vendor, as well as any of other information utilized by the integrated infrastructure secure communication engine 304 discussed below. In specific examples, the certificate database 310 may be included as part of and/or only accessible by the management subsystem 306 (e.g., the BMC, storage controller, or networking OS discussed above). The chassis 302 may also house a communication system 312 that is coupled to the integrated infrastructure secure communication engine 304 (e.g., via a coupling between the communication system 312 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure.

The chassis 302 may also house one or more computing components 314 that one of skill in the art in possession of the present disclosure will recognize may be provided by any component (e.g., hardware devices, applications, workloads, other software, etc.) that is configured to generate and/or receive the communications discussed below. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4A:
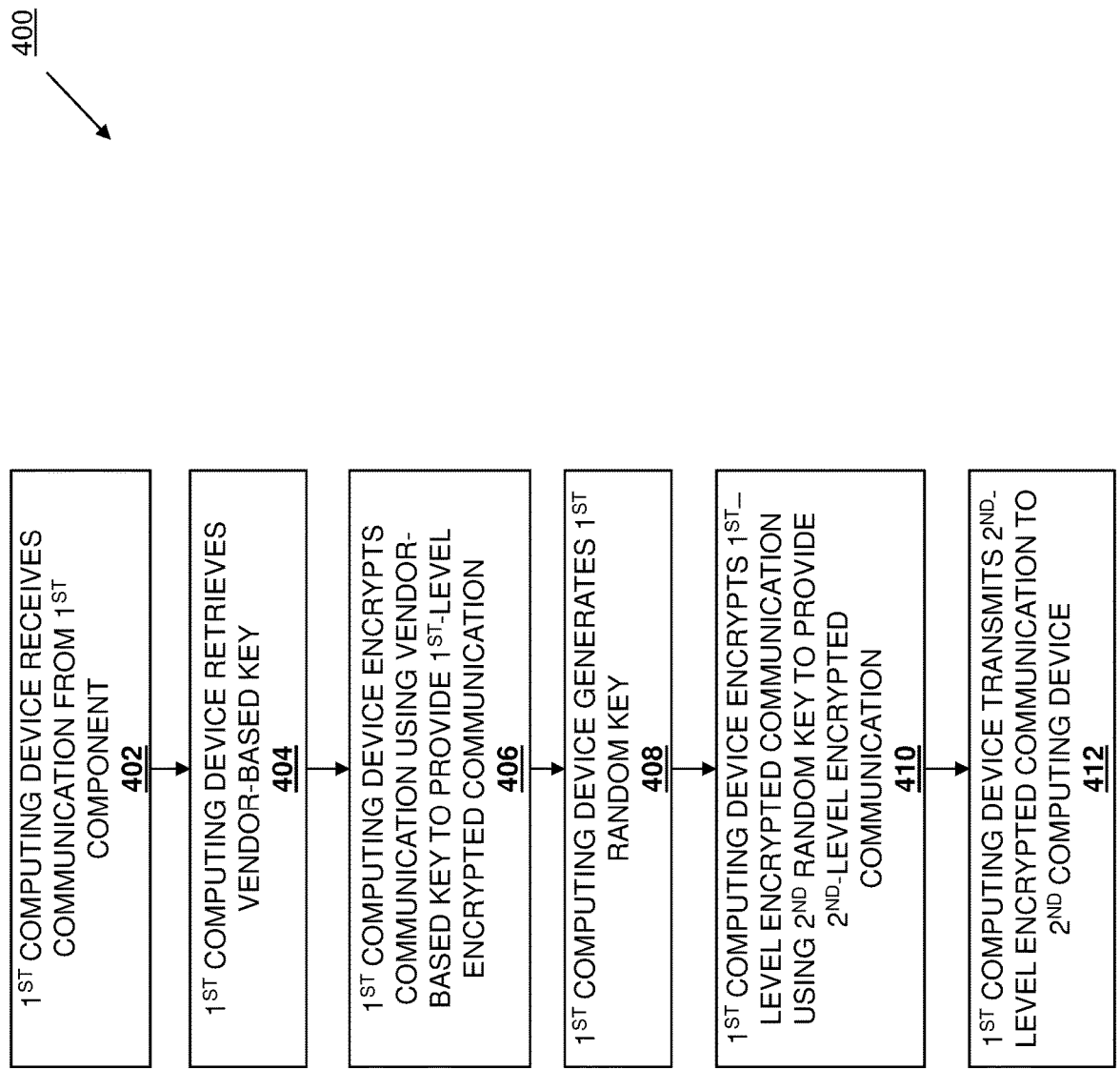
FIG. 4A is a flow chart illustrating an embodiment of a portion of a method for securing communications in an integrated infrastructure system.
Figure 4B:
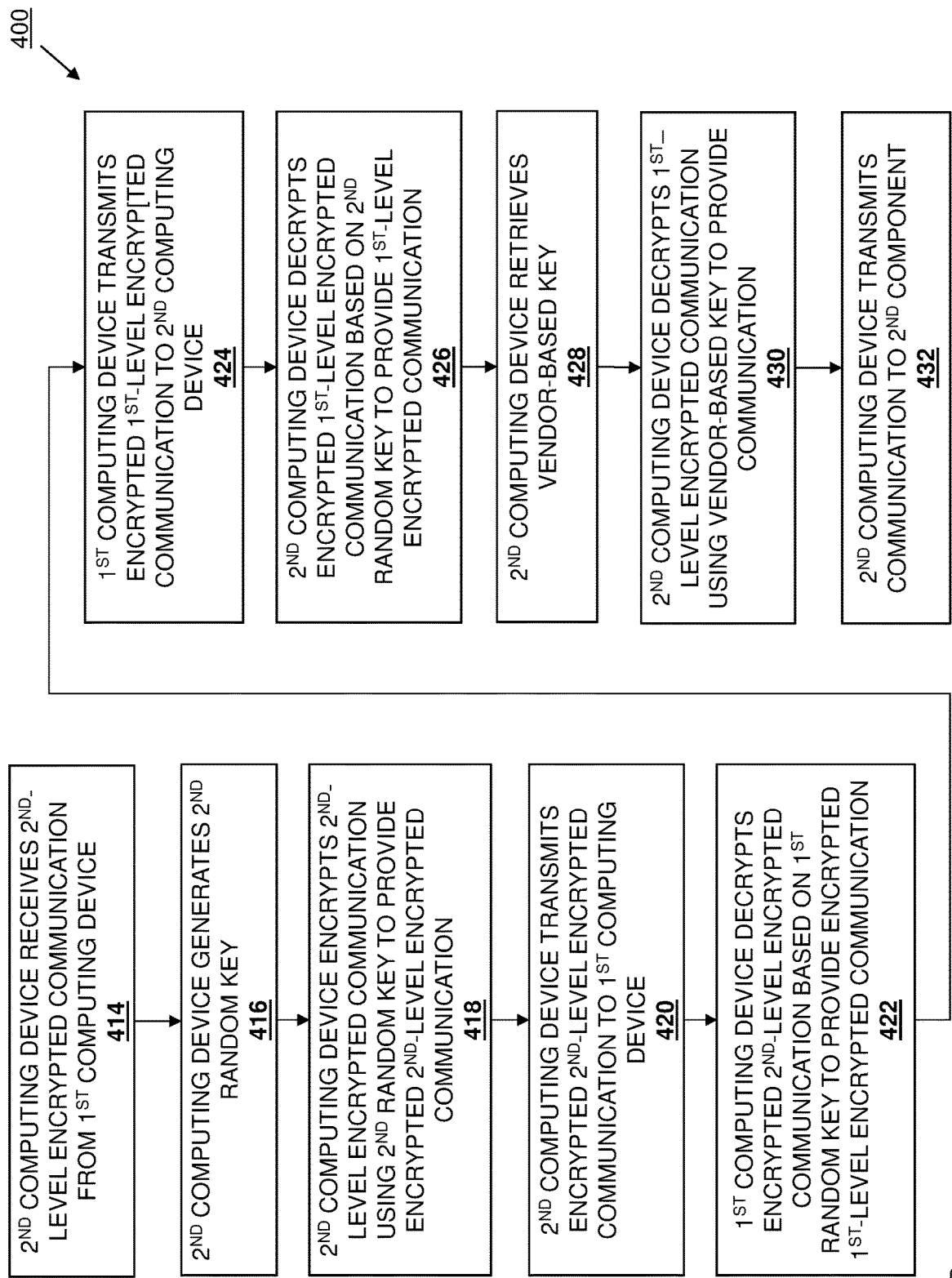
FIG. 4B is a flow chart illustrating an embodiment of a portion of a method for securing communications in an integrated infrastructure system.

Referring now to FIGS. 4A and 4B, an embodiment of a method 400 for securing communications in an integrated infrastructure system is illustrated. As discussed below, the systems and methods of the present disclosure provide a vendor-based device-level trust boundary that may be established for networked communications between computing devices in an integrated infrastructure system, and that utilizes a common vendor-based certificate/key and hardware-based random key generation to secure data packets and/or other communications transmitted between the computing devices in the integrated infrastructure system. For example, the integrated infrastructure secure communication system may include at least one chassis, and a plurality of computing devices that are located in the at least one chassis and that are coupled to each other. A first computing device included in the plurality of computing device receives a communication from a first component in the first computing device, retrieves a vendor-based key, and encrypts the communication using the vendor-based key to provide a first-level encrypted communication. The first computing device also generates a first random key, encrypts the first-level encrypted communication with the first random key to provide a second-level encrypted communication, and transmits the second-level encrypted communication to a second computing device that is included in the plurality of computing devices.

The second computing device may then receive the second-level encrypted communication from the first computing device, generate a second random key, encrypt the second-level encrypted communication with the second random key to provide an encrypted second-level encrypted communication, and transmit the encrypted second-level encrypted communication to the first computing device. The first computing device may then receive the encrypted second-level encrypted communication from the second computing device, decrypt the encrypted second-level encrypted communication based on the first random key to provide an encrypted first-level encrypted communication, and transmit the encrypted first-level encrypted communication to the second computing device. The second computing device may then receive the encrypted first-level encrypted communication from the first computing device, decrypt the encrypted first-level encrypted communication based on the second random key to provide the first-level encrypted communication, retrieve the vendor-based key, decrypt the first-level encrypted communication using the vendor-based key to provide the communication, and transmit the communication to a second component in the second computing device. As such, the systems and method of the present disclosure may provide a secure, distributed root-of-trust in composable hardware platforms or similar solution-clustered nodes via a secure distributed security module that integrates vendor-hardware-component-specific key management with platform-vendor-specific-key management.

With reference to FIG. 4A, the method 400 begins at block 402 where a first computing device receives a communication from a first component. In the examples below, the computing device 204a/300 generates and encrypts a communication and transmits it to the computing device 204b/300, but one of skill in the art in possession of the present disclosure will appreciate that any of the computing devices 204a-204c/300 may generate, encrypt, and transmit a communication to another computing device in the integrated infrastructure system 200 while remaining within the scope of the present disclosure as well. In some embodiment, during or prior to the method 400, the management subsystem 306 in each of the computing devices 204a-204c/300 may operate to identify a computing device inventory of its computing device that may include any of a variety of details about the components, devices, and/or other subsystems that are included in that computing device. Furthermore, the management subsystem 306 in each of the computing devices 204a-204c/300 may also operate to utilize the computing device inventory to create a map of components, devices, and/or other subsystems in that computing device that include a processor and a random key generation module such as the PUF module discussed above, which as discussed below allows for the selection of those components, devices, and/or other subsystems for generating the random key (i.e., using the PUF module and the processor in that component, device, and/or other subsystem) that is utilized in the encryption and/or decryption operations discussed below.

Figure 5A:
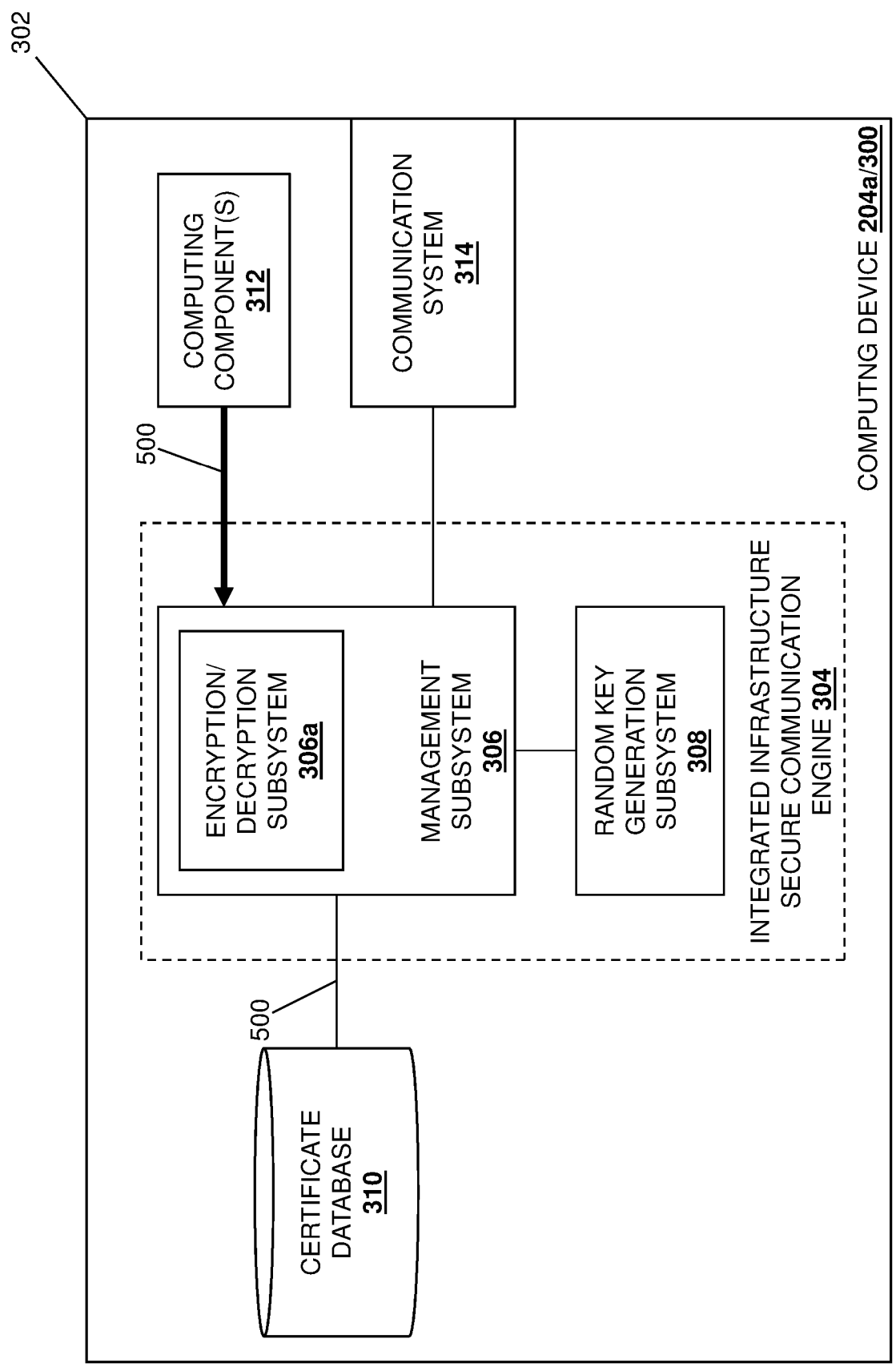
FIG. 5A is a schematic view illustrating an embodiment of the computing device of FIG. 5 operating during the method of FIG. 2.

With reference to FIG. 5A, in an embodiment of block 402, the integrated infrastructure secure communication engine 304 in the computing device 204a/300 may perform communication receiving operations 500 that may include one of the computing components 312 in the computing device 204a/300 generating and transmitting a data packet or other communication $C_{204a}$ to the integrated infrastructure secure communication engine 304 in the computing device 204a/300 such that that communication $C_{204a}$ is received by the management subsystem 306 in the computing device 204a/300.

Figure 5B:
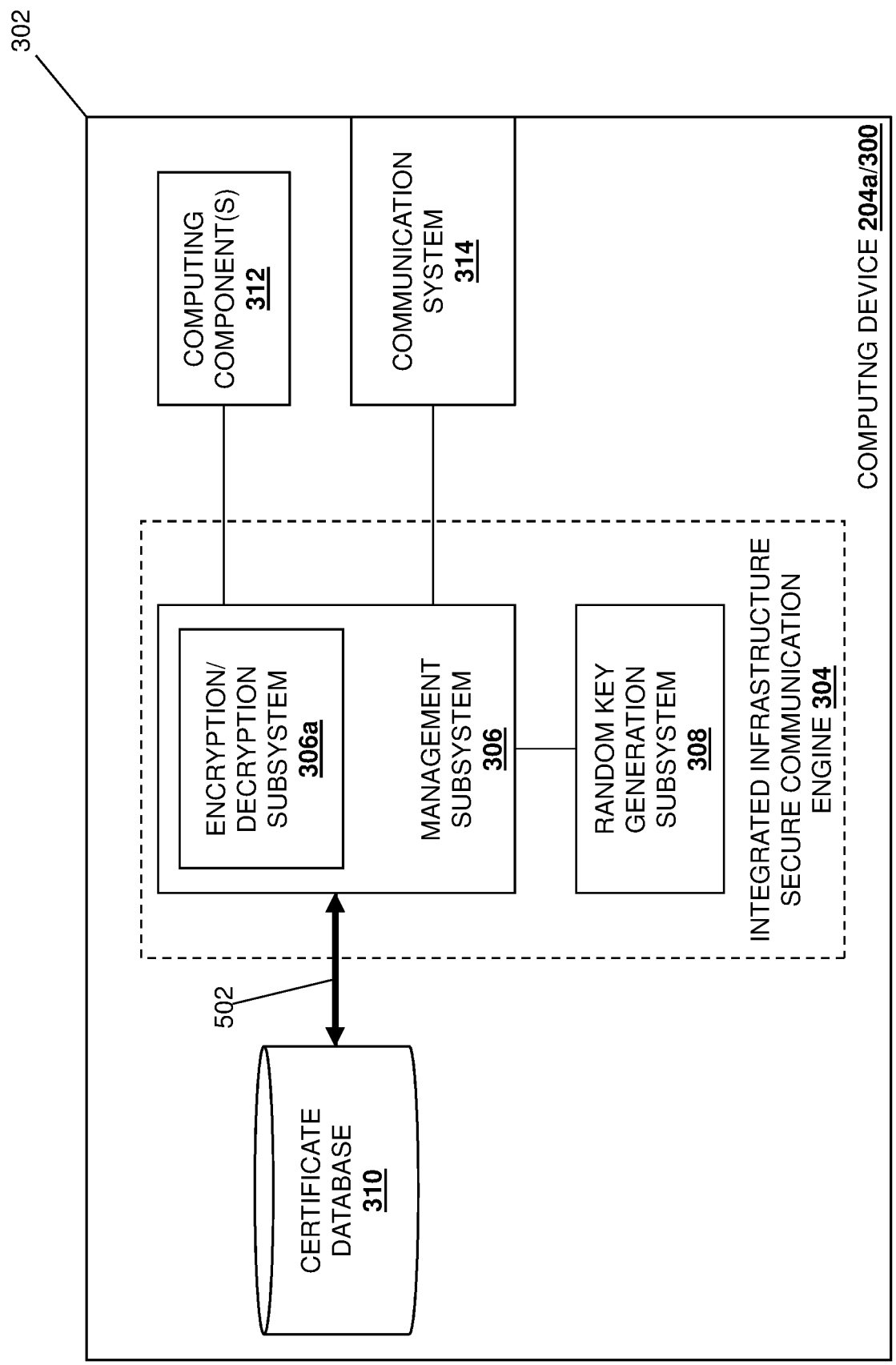
FIG. 5B is a schematic view illustrating an embodiment of the computing device of FIG. 5 operating during the method of FIG. 2.

The method 400 then proceeds to block 404 where the first computing device retrieves a vendor-based key. With reference to FIG. 5B, in an embodiment of block 404, the integrated infrastructure secure communication engine 304 in the computing device 204a/300 may then perform vendor-based key retrieval operations 502 that may include the management subsystem 306 in the computing device 204a/300 accessing a vendor-based certificate that is included in the certificate database 310 in the computing device 204a/300 and using the vendor-based certificate to generate a vendor-based key. As discussed above, a vendor or other provider of the computing device 204a/300 (which is the same vendor/provider of the other computing devices 204b and up to 204c in the integrated infrastructure system 200) may provide the same vendor-based certificate in the certificate database 310 of each of the computing devices 204a-204c/300 in the integrated infrastructure system 200, which one of skill in the art in possession of the present disclosure will recognize allows the management subsystem 306 in each of those computing devices 204a-204c/300 to generate the same vendor-based key as discussed below.

The method 400 then proceeds to block 406 where the first computing device encrypts the communication using the vendor-based key to provide a first-level encrypted communication. In an embodiment, at block 406, the integrated infrastructure secure communication engine 304 in the computing device 204a/300 may then perform vendor-based key communication encryption operations that may include the encryption/decryption subsystem 306a in the management subsystem 306 in the computing device 204a/300 using the vendor-based key retrieved at block 404 to encrypt the communication $C_{204a}$ received from the computing component 312 in the computing device 204a/300 to provide a first-level encrypted communication $F_{VENDOR-KEY}(C_{204a})$.

Figure 5C:
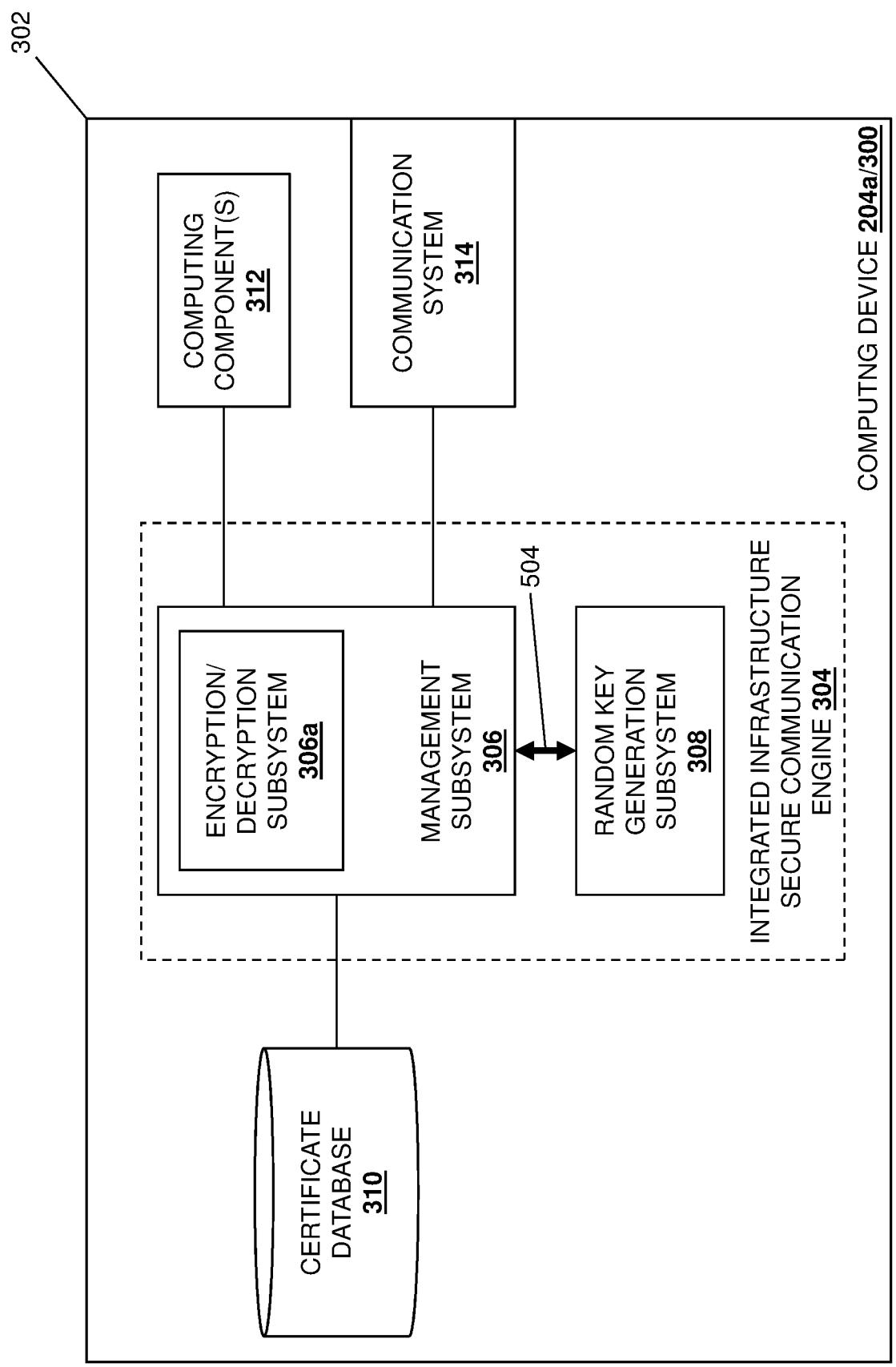
FIG. 5C is a schematic view illustrating an embodiment of the computing device of FIG. 5 operating during the method of FIG. 2.

The method 400 then proceeds to block 408 where the first computing device generates a first random key. With reference to FIG. 5C, in an embodiment of block 408, the integrated infrastructure secure communication engine 304 in the computing device 204a/300 may then perform random key generation operations 504 that may include the management subsystem 306 in the computing device 204a/300 communicating with the random key generation subsystem 308 in the computing device 204a/300 to cause the random key generation subsystem 308 in the computing device 204a/300 to generate a random key and provide that random key to the management subsystem 306 in the computing device 204a/300. In a specific example, the generation of the random key by the random key generation subsystem 308 in the computing device 204a/300 may include a processor in the SmartNIC device that provides a portion of the random key generation subsystem 308 using the PUF module that provides a portion of the random key generation subsystem 308 to generate the random key based on entropy provided by the PUF module. As will be appreciated by one of skill in the art in possession of the present disclosure, the entropy discussed above may be provided by the PUF module via a clock speed (e.g., a Central Processing Unit (CPU) clock speed) of the processor (or other chip-level random behavior), and allows for the generation of random keys that will be different when generated at different times (i.e., due to that clock speed or other chip-level random behavior changing over time). However, while a specific technique for generating random keys is described, one of skill in the art in possession of the present disclosure will appreciate how other random key generation techniques will fall within the scope of the present disclosure as well.

The method 400 then proceeds to block 410 where the first computing device encrypts the first-level encrypted communication using the first random key to provide a second-level encrypted communication. In an embodiment, at block 410, the integrated infrastructure secure communication engine 304 in the computing device 204a/300 may then perform random key communication encryption operations that may include the encryption/decryption subsystem 306a in the management subsystem 306 in the computing device 204a/300 using the random key generated at block 408 to encrypt the first-level encrypted communication $F_{VENDOR-KEY}$ ($C_{204a}$) to provide a second-level encrypted communication $F_{RANDOM-KEY-204a}$ ($F_{VENDOR-KEY}$ ($C_{204a}$)). As discussed below, in some embodiment, the management subsystem 306 in the computing device 204a/300 may sign the second-level encrypted communication $F_{RANDOM-KEY-204a}$($F_{VENDOR-KEY}$ ($C_{204a}$)) using, for example, a private key that is controlled by the management subsystem in the computing device 204a/300 and that is part of a public/private key pair with a public key that may have been provided to any computing device(s) in the integrated infrastructure system 200 with which the computing device 204a/300 will communicate. In some embodiments, the management subsystem 306 in the computing device 204a/300 may then temporarily store the first random key (e.g., in the certificate database 310 or a similar secure database) for use in the decryption operations discussed below.

Figure 5D:
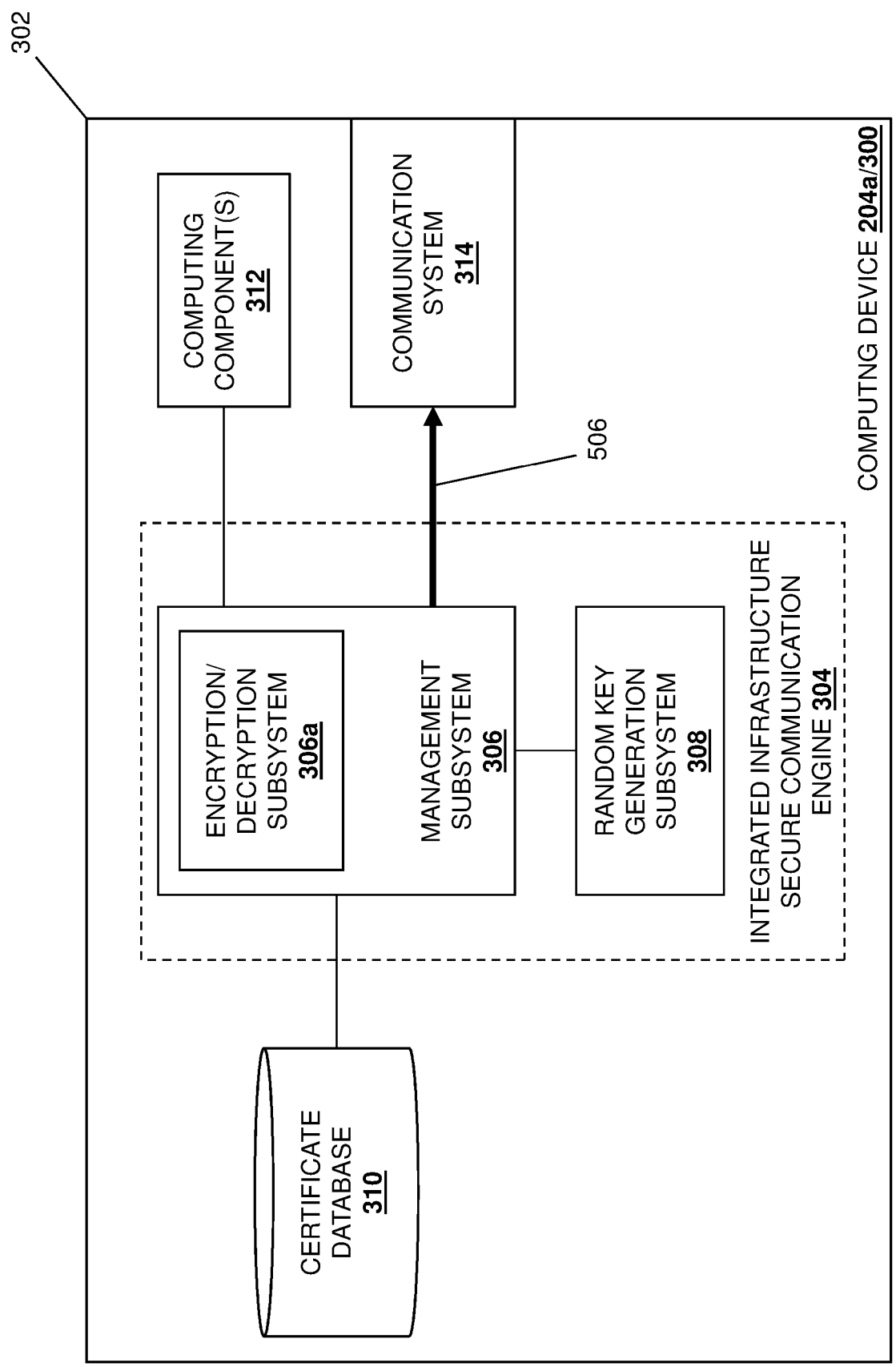
FIG. 5D is a schematic view illustrating an embodiment of the computing device of FIG. 5 operating during the method of FIG. 2.

The method 400 then proceeds to block 412 where the first computing device transmits the second-level encrypted communication to a second computing device. With reference to FIG. 5D, in an embodiment of block 412, the integrated infrastructure secure communication engine 304 in the computing device 204a/300 may then perform second-level encrypted communication transmission operations 506 that may include transmitting the second-level encrypted communication $F_{RANDOM-KEY-204a}$ ($F_{VENDOR-KEY}$ ($C_{204a}$)) via the communication system 314 in the computing device 204a to another computing device in the integrated infrastructure system 200. As such, the portion of the method 400 illustrated in FIG. 4A illustrates how a computing device in an integrated infrastructure system may encrypt a communication for transmission to another computing device in the integrated infrastructure system using a vendor-based key that is shared between the computing devices, and a random key that is generated by the computing device encrypting and transmitting that communication.

Figure 6A:
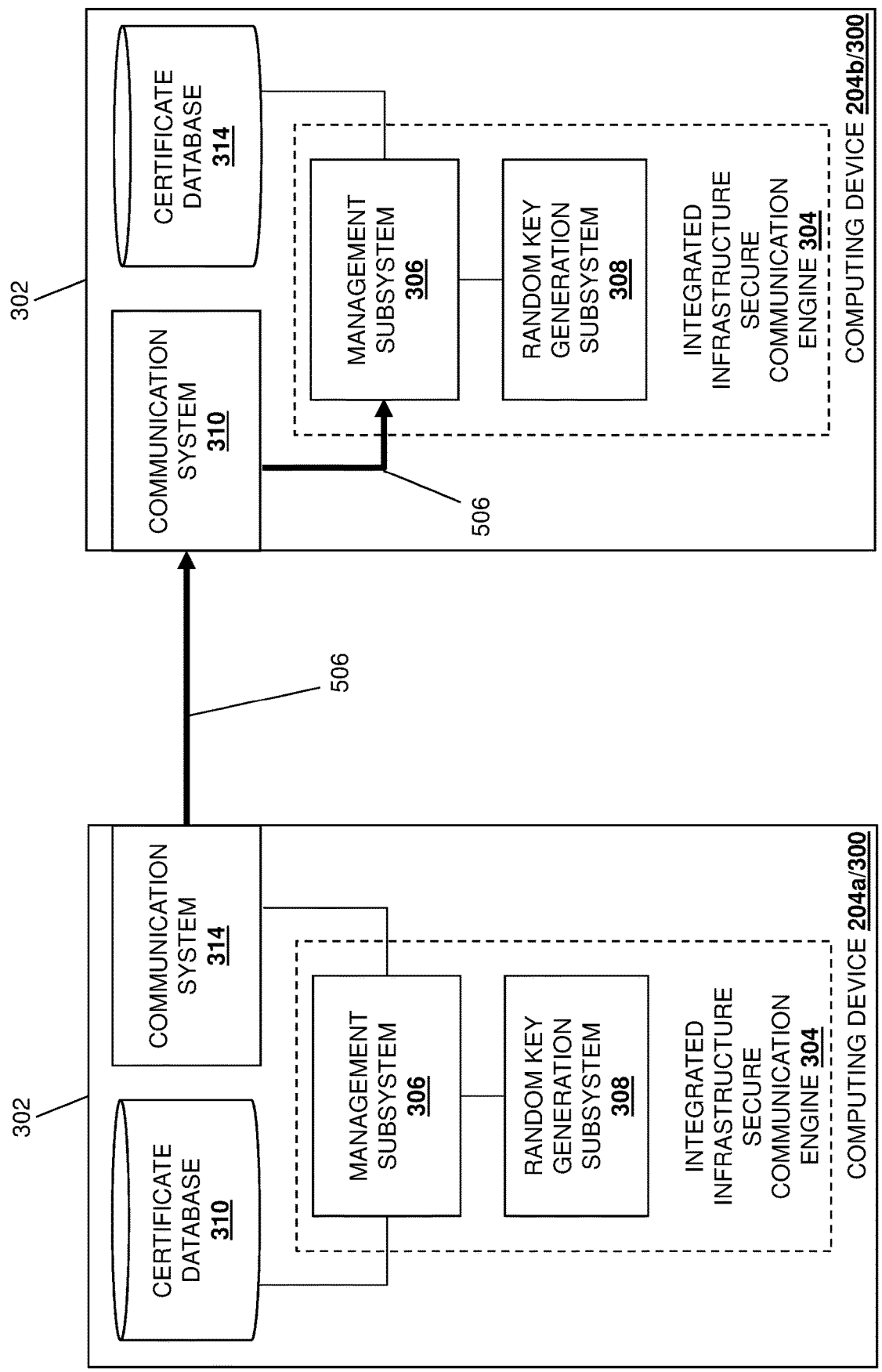
FIG. 6A is a schematic view illustrating an embodiment of the networked system of FIG. 2 and the computing device of FIG. 5 operating during the method of FIG. 2.

With reference now to FIG. 4B, the method 400 may then proceed to block 414 where the second computing device receives the second-level encrypted communication from the first computing device. With reference to FIG. 6A, in an embodiment of block 414 and as part of the second-level encrypted communication transmission operations 506 discussed above, the second-level encrypted communication $F_{RANDOM-KEY-204a}$ ($F_{VENDOR-KEY}$($C_{204a}$)) transmitted by the integrated infrastructure secure communication engine 304 in the computing device 204a/300 may be received by the management subsystem 306 in the computing device 204b/300 via the communication system 310 in the computing device 204b/300. In some embodiments, upon receiving the second-level encrypted communication $F_{RANDOM-KEY-204a}$ ($F_{VENDOR-KEY}$ ($C_{204a}$)) from the computing device 204a/300, the management subsystem 306 in the computing device 204b/300 may utilize a public key that is part of a public/private key pair with a private key that is controlled by the management subsystem 306 in the computing device 204a/300 in order to validate a signature that was provided with the second-level encrypted communication $F_{RANDOM-KEY-204a}$ ($F_{VENDOR-KEY}$ ($C_{204a}$)) by the management subsystem 306 in the computing device 204a/300 using that private key. As such, one of skill in the art in possession of the present disclosure will appreciate how the second-level encrypted communication $F_{RANDOM-KEY-204a}$ ($F_{VENDOR-KEY}$ ($C_{204a}$)) may be validated before further blocks of the method 400 will be performed by the computing device 204b/300.

Figure 6B:
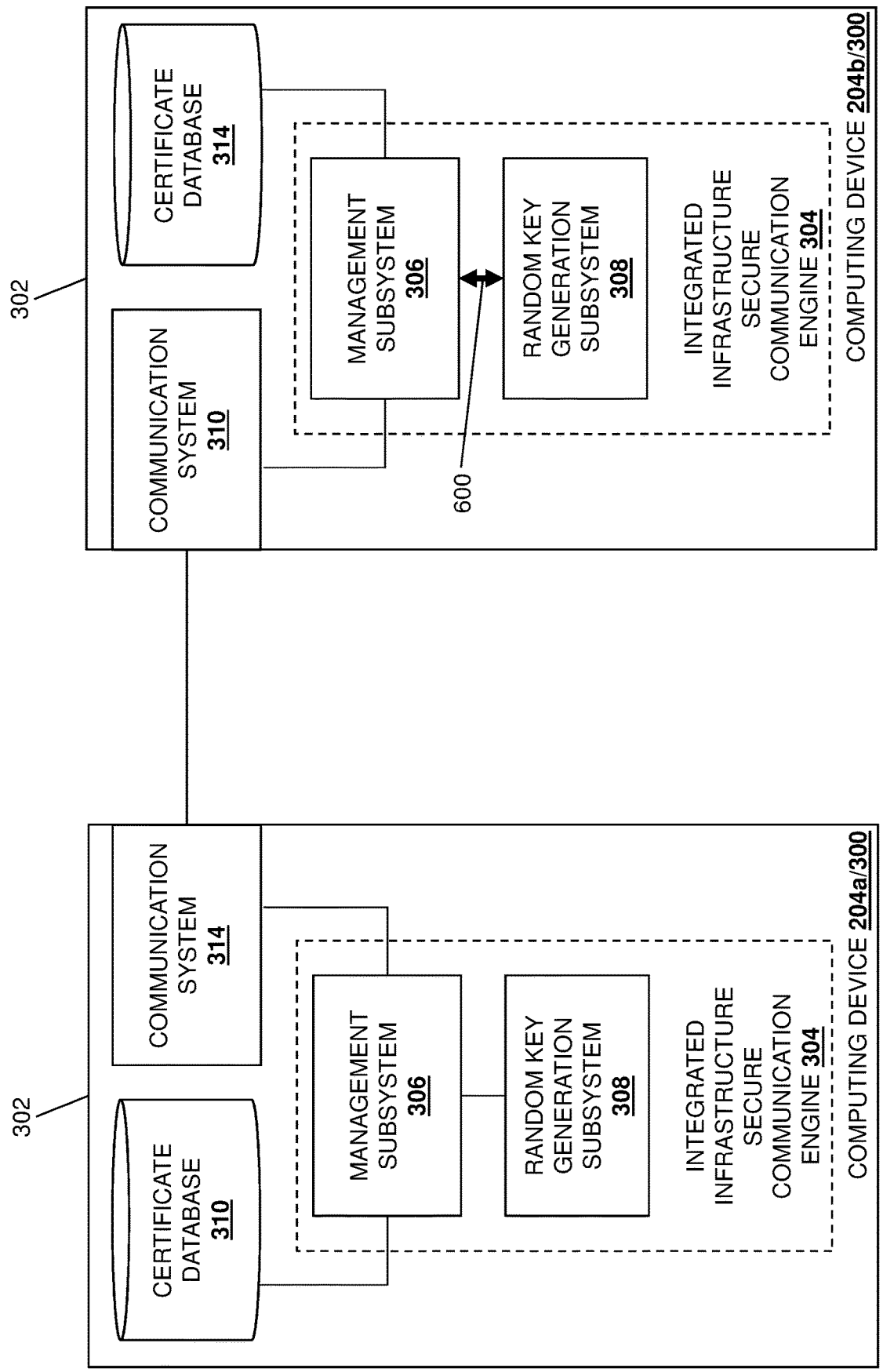
FIG. 6B is a schematic view illustrating an embodiment of the networked system of FIG. 2 and the computing device of FIG. 5 operating during the method of FIG. 2.

The method 400 then proceeds to block 416 where the second computing device generates a second random key. With reference to FIG. 6B, in an embodiment of block 416, the integrated infrastructure secure communication engine 304 in the computing device 204b/300 may then perform random key generation operations 600 that may include the management subsystem 306 in the computing device 204b/300 communicating with the random key generation subsystem 308 in the computing device 204b/300 to cause the random key generation subsystem 308 in the computing device 204b/300 to generate a random key and provide that random key to the management subsystem 306 in the computing device 204b/300. Similarly as discussed above, the generation of the random key by the random key generation subsystem 308 in the computing device 204b/300 may include a processor in the SmartNIC device that provides a portion of the random key generation subsystem 308 using the PUF module that provides a portion of the random key generation subsystem 308 to generate the random key based on entropy provided by the PUF module. As also discussed above, the entropy may be provided by the PUF module via a clock speed (e.g., a Central Processing Unit (CPU) clock speed) of the processor (or other chip-level random behavior), and allows for the generation of random keys that will be different when generated at different times (i.e., due to that clock speed or other chip-level random behavior changing over time). However, while a specific technique for generating random keys is described, one of skill in the art in possession of the present disclosure will appreciate how other random key generation techniques will fall within the scope of the present disclosure as well.

The method 400 then proceeds to block 418 where the second computing device encrypts the second-level encrypted communication using the second random key to provide an encrypted second-level encrypted communication. In an embodiment, at block 418, the integrated infrastructure secure communication engine 304 in the computing device 204b/300 may then perform random key communication encryption operations that may include the encryption/decryption subsystem 306a in the management subsystem 306 in the computing device 204b/300 using the random key generated at block 416 to encrypt the second-level encrypted communication $F_{RANDOM-KEY-204a}$ ($F_{VENDOR-KEY}$($C_{204a}$)) to provide an encrypted second-level encrypted communication $F_{RANDOM-KEY-204b}$ ($F_{RANDOM-KEY-204a}$ ($F_{VENDOR-KEY}$ ($C_{204a}$))). In some embodiments, the management subsystem 306 in the computing device 204b/300 may then temporarily store the second random key (e.g., in the certificate database 310 or a similar secure database) for use in the decryption operations discussed below.

Figure 6C:
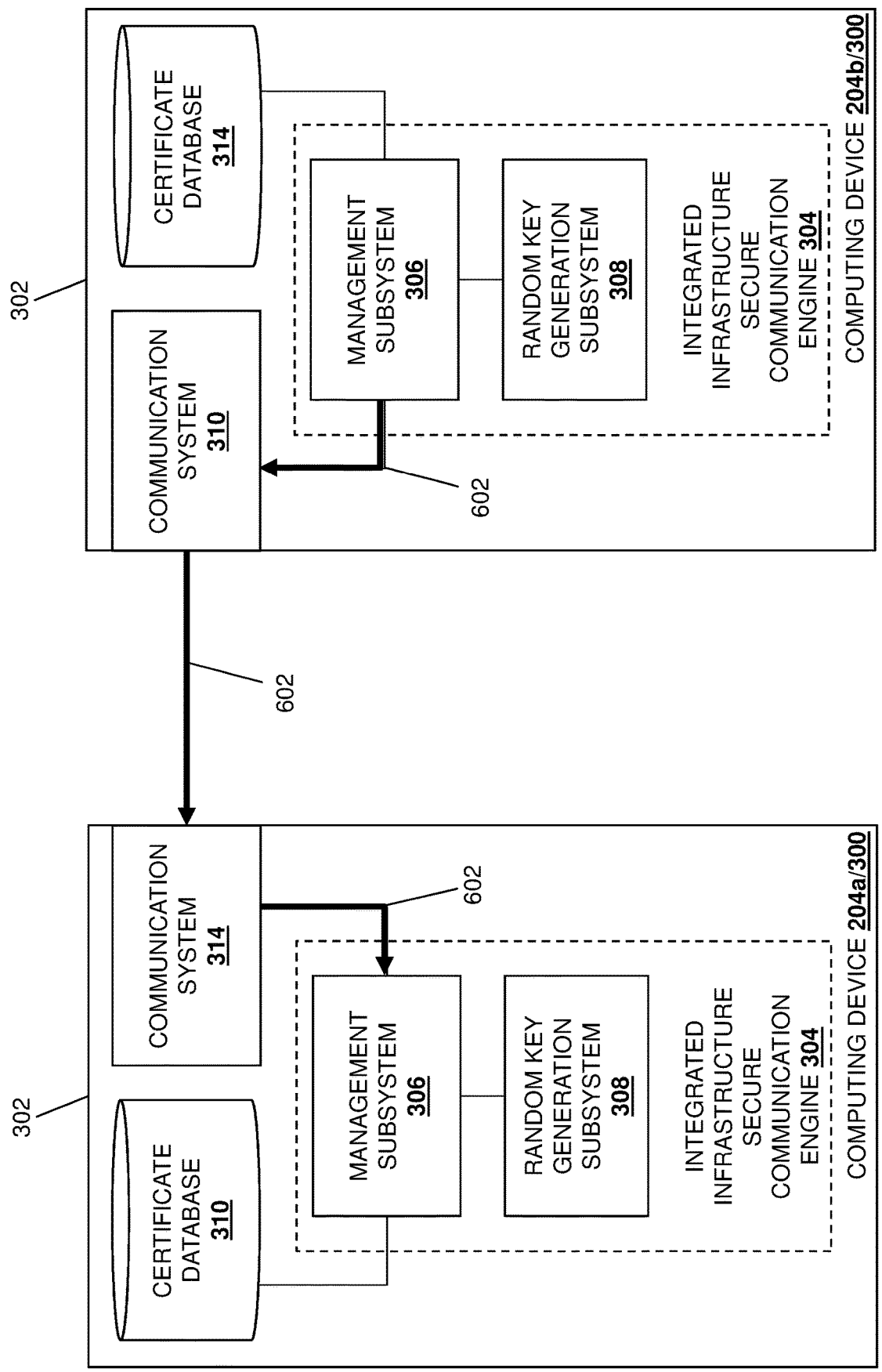
FIG. 6C is a schematic view illustrating an embodiment of the networked system of FIG. 2 and the computing device of FIG. 5 operating during the method of FIG. 2.

The method 400 then proceeds to block 420 where the second computing device transmits the encrypted second-level encrypted communication to the first computing device. With reference to FIG. 6C, in an embodiment of block 420, the integrated infrastructure secure communication engine 304 in the computing device 204b/300 may then perform encrypted second-level encrypted communication transmission operations 602 that may include transmitting the encrypted second-level encrypted communication $F_{RANDOM-KEY-F204b}$ ($F_{RANDOM-KEY-204a}$ ($F_{VENDOR-KEY}$ ($C_{204a}$))) via the communication system 314 in the computing device 204b/300 to the computing device 204a/300 in the integrated infrastructure system 200 such that the management subsystem 306 in the computing device 204a/300 receives the encrypted second-level encrypted communication $F_{RANDOM-KEY-204b}$ ($F_{RANDOM-KEY-204a}$ ($F_{VENDOR-KEY}$ ($C_{204a}$))) via the communication system 314 in the computing device 204a/300.

The method 400 then proceeds to block 422 where the first computing device decrypts the encrypted second-level encrypted communication based on the first random key to provide an encrypted first-level encrypted communication. In an embodiment, at block 422, the integrated infrastructure secure communication engine 304 in the computing device 204a/300 may then perform random-key-based encrypted second-level encrypted communication decryption operations that may include the encryption/decryption subsystem 306a in the management subsystem 306 in the computing device 204a/300 decrypting the encrypted second-level encrypted communication $F_{RANDOM-KEY-204b}$ ($F_{RANDOM-KEY-204a}$ ($F_{VENDOR-KEY}$ ($C_{204a}$))) to provide an encrypted first-level encrypted communication ($F_{RANDOM-KEY-204b}$ ($F_{VENDOR-KEY}$ ($C_{204a}$))). In a specific example, the random-key-based encrypted second-level encrypted communication decryption operations may include a processor in the SmartNIC device that provides a portion of the random key generation subsystem 308 using a PUF inverse mode of the PUF module that provides a portion of the random key generation subsystem 308 to generate an inverse function that is based on the first random key (e.g., $F_{RANDOM-KEY-204a}^{-1}$) and that may be utilized to decrypt the encrypted second-level encrypted communication $F_{RANDOM-KEY-204b}$ ($F_{RANDOM-KEY-204a}$ ($F_{VENDOR-KEY}$ ($C_{204a}$))) to provide the encrypted first-level encrypted communication $F_{RANDOM-KEY-204a}^{-1}$ ($F_{RANDOM-KEY-204b}$ ($F_{RANDOM-KEY-204a}$ ($F_{VENDOR-KEY}$ ($C_{204a}$))))= ($F_{RANDOM-KEY-204b}$ ($F_{VENDOR-KEY}$($C_{204a}$))). However, while a specific decryption technique has been described, one of skill in the art in possession of the present disclosure will appreciate that other decryption techniques will fall within the scope of the present disclosure as well.

Figure 6D:
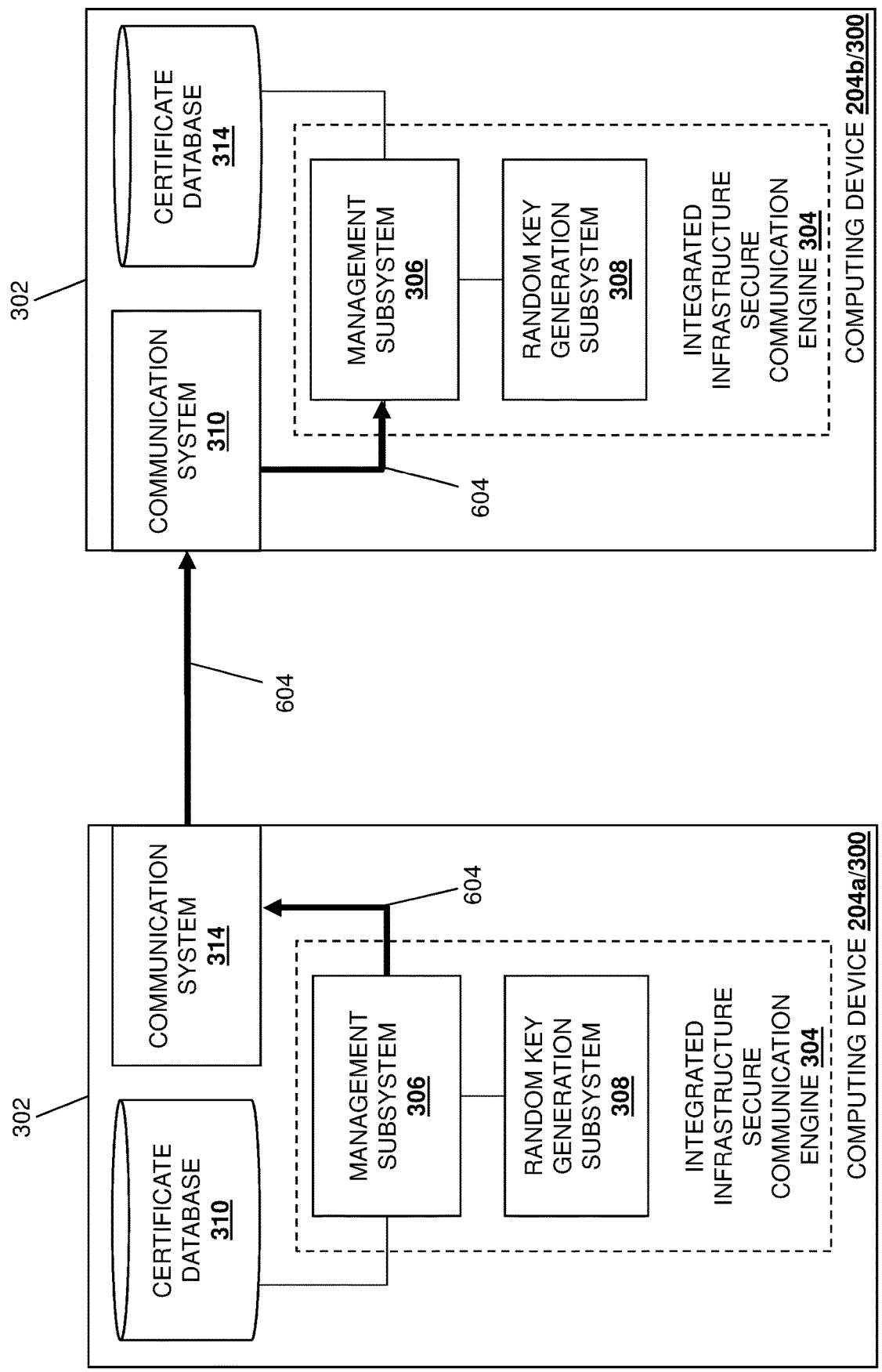
FIG. 6D is a schematic view illustrating an embodiment of the networked system of FIG. 2 and the computing device of FIG. 5 operating during the method of FIG. 2.

The method 400 then proceeds to block 424 where the first computing device transmits the encrypted first-level encrypted communication to the second computing device. With reference to FIG. 6D, in an embodiment of block 424, the integrated infrastructure secure communication engine 304 in the computing device 204a/300 may then perform encrypted first-level encrypted communication transmission operations 604 that may include transmitting the encrypted first-level encrypted communication ($F_{RANDOM-KEY-204b}$ ($F_{VENDOR-KEY}$ ($C_{204a}$))) via the communication system 314 in the computing device 204a to the computing device 204b/300 in the integrated infrastructure system 200 such that the management subsystem 306 in the computing device 204b/300 receives the encrypted first-level encrypted communication ($F_{RANDOM-KEY-204b}$ ($F_{VENDOR-KEY}$ ($C_{204a}$))) via the communication system 314 in the computing device 204b/300.

Figure 6E:
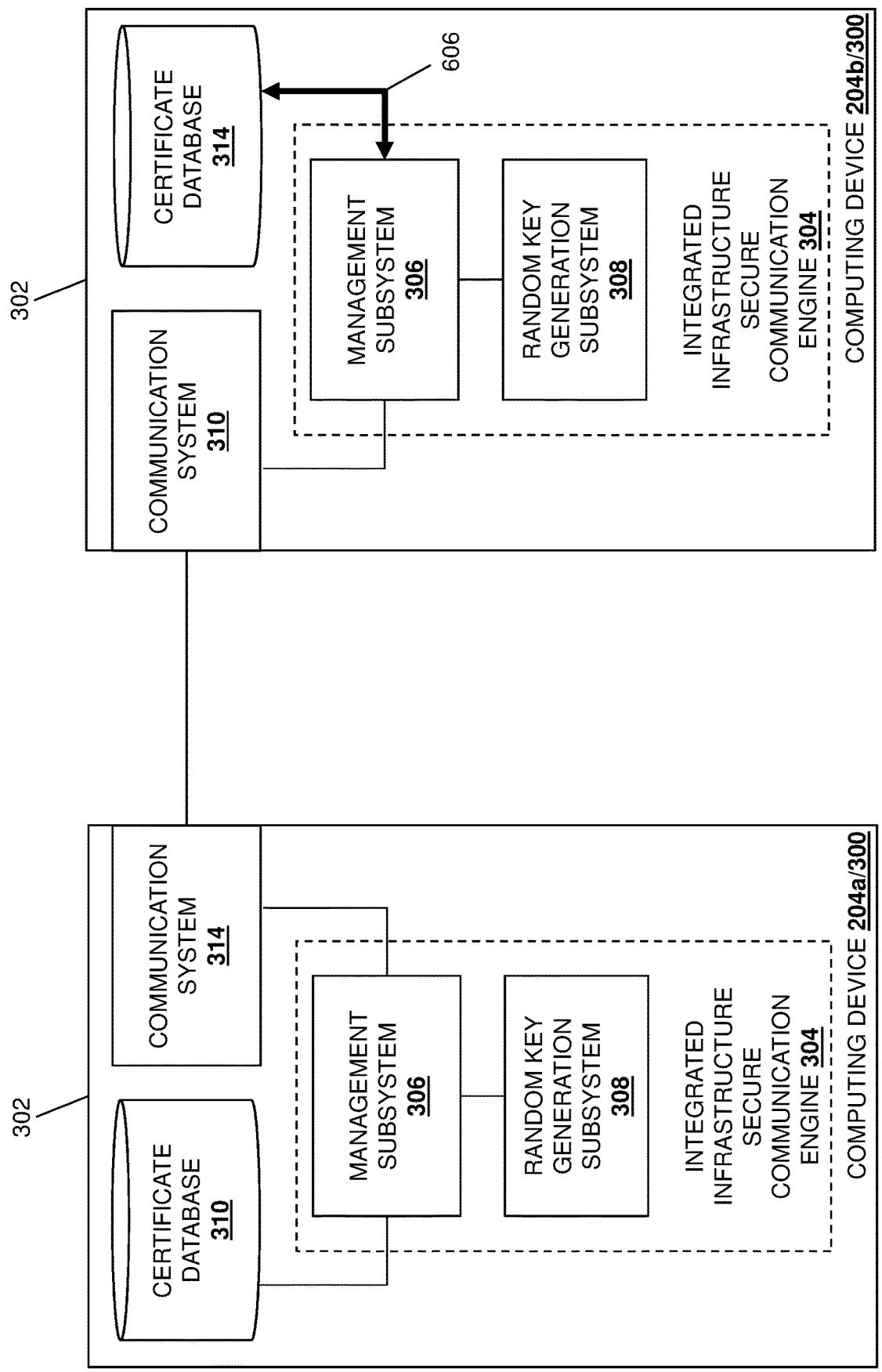
FIG. 6E is a schematic view illustrating an embodiment of the networked system of FIG. 2 and the computing device of FIG. 5 operating during the method of FIG. 2.

The method 400 then proceeds to block 426 where the second computing device decrypts the encrypted first-level encrypted communication based on the second random key to provide the first-level encrypted communication. In an embodiment, at block 426, the integrated infrastructure secure communication engine 304 in the computing device 204b/300 may then perform random-key-based encrypted first-level encrypted communication decryption operations that may include the encryption/decryption subsystem 306a in the management subsystem 306 in the computing device 204b/300 decrypting the encrypted first-level encrypted communication $F_{RANDOM-KEY-204b}$ ($F_{VENDOR-KEY}$($C_{204a}$)) to provide the first-level encrypted communication ($F_{VENDOR-KEY}$ ($C_{204a}$)) In a specific example, the random-key-based encrypted first-level encrypted communication decryption operations may include a processor in the SmartNIC device that provides a portion of the random key generation subsystem 308 using a PUF inverse mode of the PUF module that provides a portion of the random key generation subsystem 308 to generate an inverse function that is based on the second random key (e.g., $F_{RANDOM-KEY-204b}^{-1}$) and that may be utilized to decrypt the encrypted first-level encrypted communication ($F_{RANDOM-KEY-204b}$ ($F_{VENDOR-KEY}$ ($C_{204a}$))) to provide the first-level encrypted communication $F_{RANDOM-KEY-204b}^{-1}$ ($F_{RANDOM-KEY-204b}$ ($F_{VENDOR-KEY}$ ($C_{204a}$)))=$F_{VENDOR-KEY}$ ($C_{204a}$). However, while a specific decryption technique has been described, one of skill in the art in possession of the present disclosure will appreciate that other decryption techniques will fall within the scope of the present disclosure as well The method 400 then proceeds to block 428 where the second computing device retrieves the vendor-based key. With reference to FIG. 6E, in an embodiment of block 428, the integrated infrastructure secure communication engine 304 in the computing device 204b/300 may then perform vendor-based key retrieval operations 606 that may include the management subsystem 306 in the computing device 204b/300 accessing the vendor-based certificate that is included in the certificate database 310 in the computing device 204b/300 and using the vendor-based certificate to generate a vendor-based key. As discussed above, a vendor or other provider of the computing device 204b/300 (which is the same vendor/provider of the computing devices 204a) may provide the same vendor-based certificate in the certificate database 310 of each of the computing devices 204a/300 and 204b/300 in the integrated infrastructure system, which allows the management subsystem 306 in each of those computing devices 204a/300 and 204b/300 to generate the same vendor-based key The method 400 the proceeds to block 430 where the second computing device decrypts the first-level encrypted communication using the vendor-based key to provide the communication. In an embodiment, at block 430, the integrated infrastructure secure communication engine 304 in the computing device 204b/300 may then perform vendor-based key communication decryption operations that may include the encryption/decryption subsystem 306a in the management subsystem 306 in the computing device 204b/300 using the vendor-based key retrieved at block 428 to decrypt the first-level encrypted communication $F_{VENDOR-KEY}$ ($C_{204a}$) to provide the communication $C_{204a}$. The method 400 may then proceed to block 432 where the second computing device transmits the communication to a second component. In an embodiment, at block 432, integrated infrastructure secure communication engine 304 in the computing device 204b/300 may then perform communication transmission operations that may include the management subsystem 306 transmitting the communication $C_{204a}$ to a computing component 314 in the computing device 204b/300. As such, the portion of the method 400 illustrated in FIG. 4B illustrates how a computing devices in an integrated infrastructure system may perform "barrel-shifter" encryption/decryption techniques to decrypt a communication that is encrypted with a common vendor-based key, along with respective unique random keys as it is transmitted between those computing devices, in order to allow that communication to be decrypted at the receiving computing device without the need to share the random keys generated and utilized in the encryption of that communication.

Thus, systems and methods have been described that provide a vendor-based device-level trust boundary that may be established for networked communications between server devices in a composable system, and that utilizes a common vendor-based certificate/key and hardware-based random key generation to secure data packets and/or other communications transmitted between the server devices in the composable system. For example, a composable system may include at least one rack, and a plurality of server devices that are located in the at least one rack and that are coupled to each other. A first server device in the composable system receives a communication from a first component in the first server device, retrieves a vendor-based key, and encrypts the communication using the vendor-based key to provide a first-level encrypted communication. The first server device also generates a first random key, encrypts the first-level encrypted communication with the first random key to provide a second-level encrypted communication, and transmits the second-level encrypted communication to a second server device in the composable system.

The second server device may then receive the second-level encrypted communication from the first server device, generate a second random key, encrypt the second-level encrypted communication with the second random key to provide an encrypted second-level encrypted communication, and transmit the encrypted second-level encrypted communication to the first server device. The first server device may then receive the encrypted second-level encrypted communication from the second server device, decrypt the encrypted second-level encrypted communication based on the first random key to provide an encrypted first-level encrypted communication, and transmit the encrypted first-level encrypted communication to the second server device. The second server device may then receive the encrypted first-level encrypted communication from the first server device, decrypt the encrypted first-level encrypted communication based on the second random key to provide the first-level encrypted communication, retrieve the vendor-based key, decrypt the first-level encrypted communication using the vendor-based key to provide the communication, and transmit the communication to a second component in the second server device. As such, the systems and method of the present disclosure may provide a secure, distributed root-of-trust in composable hardware platforms or similar solution-clustered nodes via a secure distributed security module that integrates vendor-hardware-component-specific key management with platform-vendor-specific-key management.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An integrated infrastructure secure communication system, comprising:
   at least one chassis; and
   a plurality of computing devices that are located in the at least one chassis and that are coupled to each other, wherein a first computing device that is included in the plurality of computing devices is configured to:
   receive a communication from a first component in the first computing device;
   retrieve a vendor-based key;
   encrypt the communication using the vendor-based key to provide a first-level encrypted communication;
   generate a first random key;
   encrypt the first-level encrypted communication with the first random key to provide a second-level encrypted communication;
   transmit the second-level encrypted communication to a second computing device that is included in the plurality of computing devices;
   receive, from the second computing device, an encrypted second-level encrypted communication provided by encrypting the second-level encrypted communication with a second random key;
   decrypt the encrypted second-level encrypted communication based on the first random key to provide an encrypted first-level encrypted communication; and
   transmit the encrypted first-level encrypted communication to the second computing device.

2. The system of claim 1, wherein the first computing device includes a Physical Unclonable Function (PUF) module that is used to generate the first random key.

3. The system of claim 2, wherein the first computing device includes a smart Network Interface Controller (SmartNIC) that is configured to use the PUF module to generate the first random key.

4. The system of claim 1, wherein the second computing device is configured to:
   receive the second-level encrypted communication from the first computing device;
   generate the second random key;
   encrypt the second-level encrypted communication with the second random key to provide the encrypted second-level encrypted communication; and
   transmit the encrypted second-level encrypted communication to the first computing device.

5. The system of claim 1, wherein the second computing device is configured to:
   validate, in response to receiving the second-level encrypted communication from the first computing device, a signature provided with the second-level encrypted communication by the first computing device.

6. The system of claim 1, wherein the first computing device includes a Baseboard Management Controller (BMC) that is configured to encrypt the communication using the vendor-based key to provide the first-level encrypted communication and.

7. The system of claim 1, wherein the second computing device is configured to:
   receive the encrypted first-level encrypted communication from the first computing device;
   decrypt the encrypted first-level encrypted communication based on the second random key to provide the first-level encrypted communication;
   retrieve the vendor-based key; and
   decrypt the first-level encrypted communication using the vendor-based key to provide the communication; and
   transmit the communication to a second component in the second computing device.

8. The system of claim 1, further comprising:
   a certificate database storing a vendor-based certificate, where in the vendor-based key is retrieved using the vendor-based certificate.

9. An Information Handling System (IHS), comprising:
a processing system; and
a memory system that is coupled to the processing system and that includes instructions that, when executed by the processing system, cause the processing system to provide an integrated infrastructure secure communication engine that is configured to:
receive a communication from a component that is coupled to the processing system;
retrieve a vendor-based key;
encrypt the communication using the vendor-based key to provide a first-level encrypted communication;
generate a first random key;
encrypt the first-level encrypted communication with the first random key to provide a second-level encrypted communication;
transmit the second-level encrypted communication to a computing device;
receive, from the computing device, an encrypted second-level encrypted communication provided by encrypting the second-level encrypted communication with a second random key;
decrypt the encrypted second-level encrypted communication based on the first random key to provide an encrypted first-level encrypted communication; and
transmit the encrypted first-level encrypted communication to the computing device.

10. The IHS of claim 9, further comprising:
a Physical Unclonable Function (PUF) module that is coupled to the processing system and that is used to generate the first random key.

11. The IHS of claim 10, further comprising:
a smart Network Interface Controller (SmartNIC) that is coupled to the processing system and that is configured to use the PUF module to generate the first random key.

12. The IHS of claim 9, wherein the processing system is included in a Baseboard Management Controller (BMC) that configured to encrypt the communication using the vendor-based key to provide the first-level encrypted communication.

13. The IHS of claim 9, further comprising:
a certificate database storing a vendor-based certificate, where in the vendor-based key is retrieved using the vendor-based certificate.

14. A method for securing communications in an integrated infrastructure system, comprising:
receiving, by a first computing device, a communication from a first component in the first computing device;
retrieving, by the first computing device, a vendor-based key;
encrypting, by the first computing device, the communication using the vendor-based key to provide a first-level encrypted communication;
generating, by the first computing device, a first random key;
encrypting, by the first computing device, the first-level encrypted communication with the first random key to provide a second-level encrypted communication;
transmitting, by the first computing device, the second-level encrypted communication to a second computing device;
receiving, by the first computing device from the second computing device, an encrypted second-level encrypted communication provided by encrypting the second-level encrypted communication with a second random key;
decrypting, by the first computing device, the encrypted second-level encrypted communication based on the first random key to provide an encrypted first-level encrypted communication; and
transmitting, by the first computing device, the encrypted first-level encrypted communication to the second computing device.

15. The method of claim 14, wherein the first computing device includes a Physical Unclonable Function (PUF) module that is used to generate the first random key.

16. The method of claim 15, wherein the first computing device includes a smart Network Interface Controller (SmartNIC) that is configured to use the PUF module to generate the first random key.

17. The method of claim 14, further comprising:
receiving, by the second computing device, the second-level encrypted communication from the first computing device;
generating, by the second computing device, the second random key;
encrypting, by the second computing device, the second-level encrypted communication with the second random key to provide an the encrypted second-level encrypted communication; and
transmitting, by the second computing device, the encrypted second-level encrypted communication to the first computing device.

18. The method of claim 14, wherein the first computing device includes a Baseboard Management Controller (BMC) that is configured to encrypt the communication using the vendor-based key to provide the first-level encrypted communication.

19. The method of claim 14, further comprising:
receiving, by the second computing device, the encrypted first-level encrypted communication from the first computing device;
decrypting, by the second computing device, decrypt the encrypted first-level encrypted communication based on the second random key to provide the first-level encrypted communication;
retrieving, by the second computing device, the vendor-based key;
decrypting, by the second computing device, the first-level encrypted communication using the vendor-based key to provide the communication; and
transmitting, by the second computing device, the communication to a second component in the second computing device.

20. The method of claim 14, wherein the vendor-based key is retrieved using a vendor-based certificate that is stored in a certificate database in the first computing device.

* * * * *